Patented Mar. 22, 1932

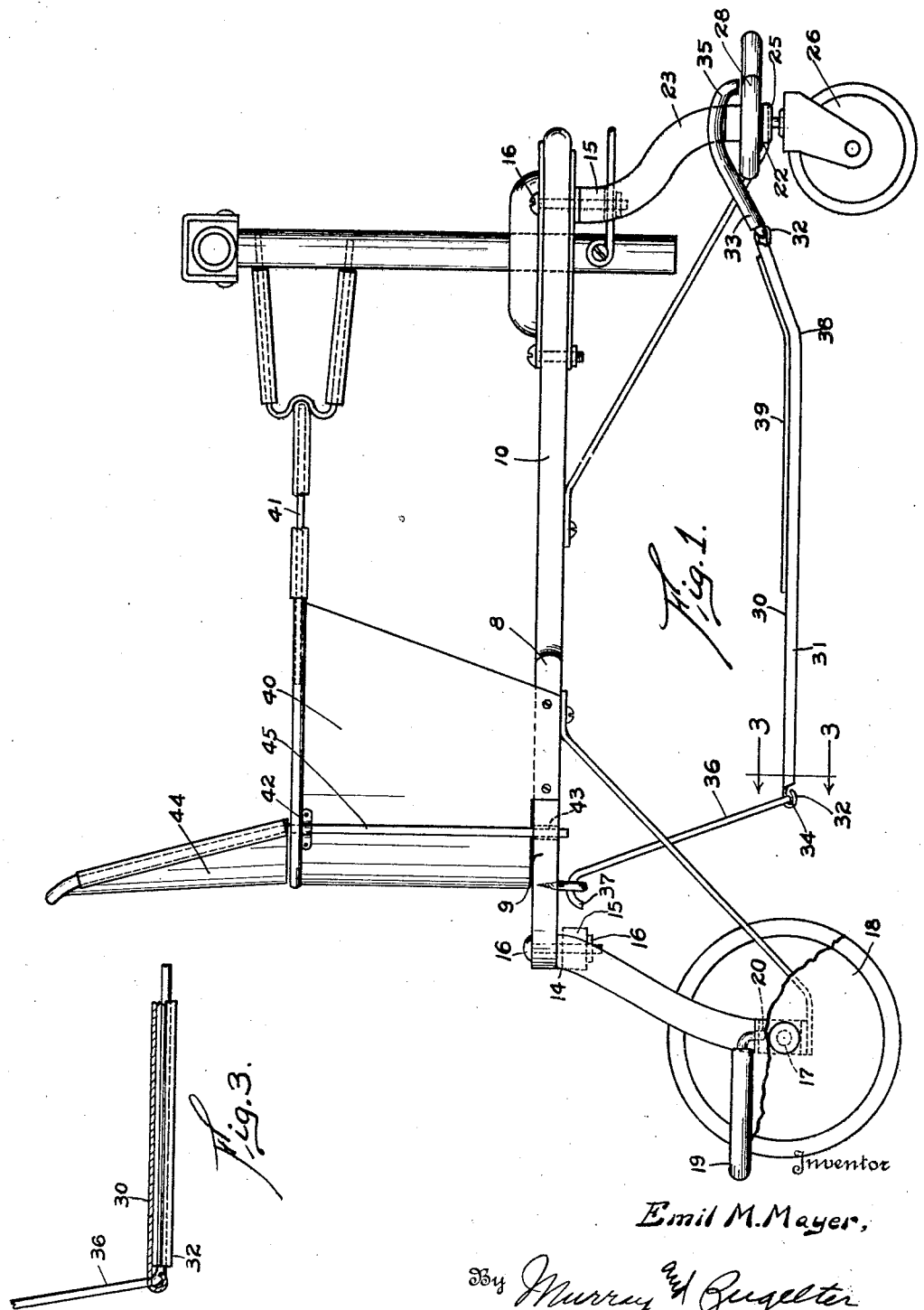

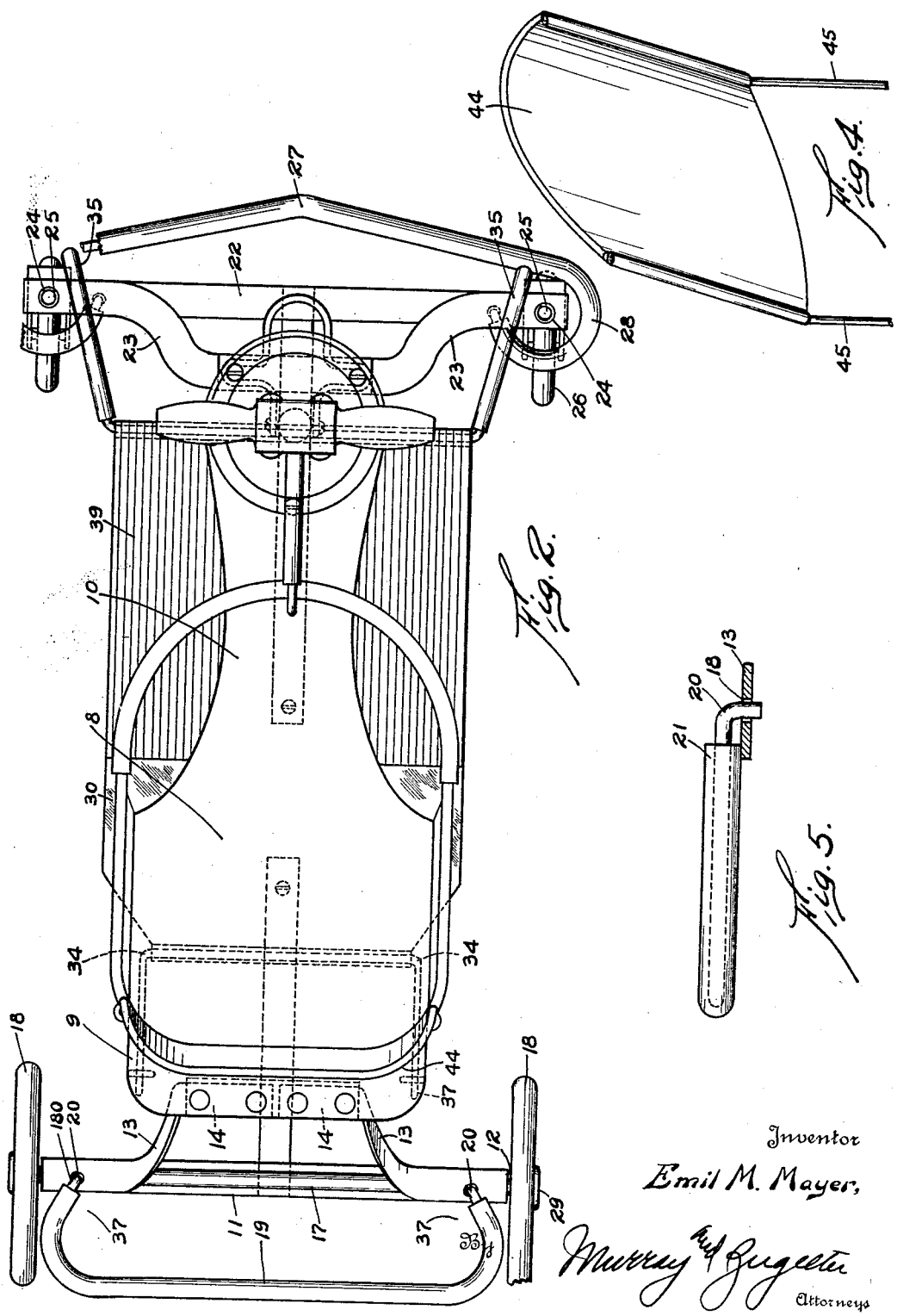

1,850,406

UNITED STATES PATENT OFFICE

EMIL M. MAYER, OF CINCINNATI, OHIO, ASSIGNOR TO IVER JOHNSON'S ARMS AND CYCLE WORKS, OF FITCHBURG, MASSACHUSETTS, A CORPORATION OF MASSACHUSETTS

CHILD'S VEHICLE

Application filed September 23, 1927. Serial No. 221,583.

This invention relates to a child's vehicle and especially to that type of vehicle commonly known as a baby walker or car, and the principal objects are to provide a removable footrest for attachment to the vehicle and to provide an adjustable or removable back rest member adapted to be mounted on the saddle board of said vehicle.

These and other objects are attained by the means described herein and disclosed in the accompanying drawings, in which:

Fig. 1 is a side elevational view of the device, a fragment being broken away.

Fig. 2 is a top plan view of the device.

Fig. 3 is a fragmental view taken on line 3—3 of Fig. 1.

Fig. 4 is a perspective view of a removable back rest member forming a part of the device of the invention.

Fig. 5 is a view taken on line 5—5 of Fig. 2.

The device comprises a bed or body member 8, the rear portion of which provides a seat 9 from which projects a narrow or reduced portion 10 to provide a space on each side thereof to accommodate the legs of a child. A rear bolster comprises a flat strip of metal 11, turned upon itself as at 12 to provide upwardly and inwardly turned arms 13, each of which are again turned upon themselves as at 14 to provide a pair of attaching members which are secured to the extreme rear and bottom face of the seat 9. It will be noted that the attaching members 14 are aligned and in the same plane with one another and are also parallel and offset from the plane of the portion 11. A suitable spacer block 15 may be disposed below the securing flanges 14 in order to provide a firm mounting for securing bolts and nuts 16. It should be noted however that the spacing block 15 may be interposed between the seat 9 and the top of securing flanges 14 in order to provide a greater distance between the floor and said seat. This feature is carried out at the forward end, wherein the bolster structure is somewhat similarly formed and mounted. Rear axle 17 extends through perforations in the turned portions 12 of the bolster and has wheels 18 rotatably mounted thereon. The lower ends of the arms 13 are perforated as at 180 to receive a bumper 19 which is simply and inexpensively formed of a single somewhat resilient rod. The bumper is substantially U-shaped and has downwardly turned ends 20 which are entered into perforations 180 while the arms of the bumper are compressed slightly toward one another. Upon releasing the pressure the outward force of the resilient member retains the bumper against displacement from its seat. It will be understood of course that the bumper is covered with a suitable material such as rubber tubing or the like 21.

As previously mentioned the front bolster is of a construction substantially similar to that of the rear bolster. This bolster comprises a flat member 22 which is somewhat larger than the rear member and has the arms 23 thereof extending more nearly horizontal than the rear arms 13. The arms 23 and strip 22 have aligned perforations 24 at opposite ends for receiving the vertical members 25 of casters 26. A front bumper 27, suitably covered, extends across the front of the bolster and has curved portions 28 which surround the ends of the front bolster and are otherwise resiliently locked to the arms 23 by having down turned ends thereon which seat in perforations in the arms. The wheels 18 and casters 26 are preferably rubber tired, and the hubs 29 of the wheels 18 are rubber capped so that the vehicle will not scratch floors or furniture regardless of the manner in which it may be moved or pushed about a room.

In order to accommodate the vehicle to the needs of a very small child, or one which is incapable of propelling the vehicle with its feet there is provided a removable foot rest or floor structure 30 which is preferably formed of a sheet of metal, the lateral edges of which are suitably turned or beaded as at 31 to prevent injury to the person, and the opposite longitudinal edges of which are bent into hook-shaped channels 32 which receive wire yokes 33 and 34 respectively. This foot rest or floor member extends from a point well beneath the center of the seat 9 forwardly into close proximity with the forward casters 26. The wire yoke 33, which is also covered or protected with rubber tubing or other suitable material passes over the top of the arms 23 of the front bolster 22 and is developed into a pair of hooked or curved members 35 which overhang the bolster. Likewise the rear yoke has a pair of rearwardly extending arms 36 having hooked portions 37 which engage in screw eyes on the bottom face of seat 9. From the foregoing it will be apparent that the foot rest 30, which is bent upwardly adjacent the front as at 38, has a pivotal mounting at each end upon the yokes, and that it will assume a position in a plane most comfortable to the child's feet when resting thereupon. The forward portion of the plate 30, or that portion which is normally occupied by the child's feet has a longitudinally ribbed covering 39 on the top face thereof in order to prevent slipping of the feet laterally from the foot rest. This covering may be ribbed or corrugated rubber, or any other suitable material. It will be noted that if the child places its feet forwardly on the foot rest, that portion of the foot rest will dip downwardly, while the rear portion adjusts itself about its pivotal mounting to the level of the child's feet. Likewise if the child draws its feet rearwardly to a position almost beneath the seat 9 the rear end will dip downwardly and the front end will rise slightly. When the child's feet are in a normal position, the foot rest will assume a substantially level position. The foot rest is precluded from lateral displacement by the hooks 35 and 37. It may be readily removed by merely releasing the hook portions. As shown in Fig. 1 a suitable metallic back rest 40 is carried by the seat 9 and serves to support the usual retaining ring 41 which extends forwardly thereof. A pair of cleats 42 are secured adjacent the top of the back rest 40 and beneath said cleats the seat 9 is provided with aligned perforations 43. A removable extension back rest 44 has a wire rod bound to its upper edges by rolling the body of the removable back rest thereover, and this rod is developed into a pair of downwardly projecting pins 45 which may be inserted through cleats 42 and into perforations 43 for removably securing it in position.

It will be readily appreciated that a handle may be secured to either the front or rear of the vehicle and with the foot rest 30 and extension back rest 44 in position, a very safe and comfortable go-cart is provided.

When it is desired to permit the child to use the vehicle as the ordinary foot propelled toy, the foot rest 30 may be readily removed, and the extension back rest 44 may be allowed to remain, or it may be removed as may be found desirable. Inasmuch as the seat member is shorter and narrower than the length and width of the wheel base, there is no danger of tipping of the vehicle either laterally or longitudinally in either direction regardless of whether the vehicle is used as a go-cart, or as a so called walker.

It should be further noted that the height of the seat from the floor may be altered by removing the blocks 15 from beneath the bolster arms 14 and interposing them between the said arms and the seat. This adjustment of the height of the body or seat requires only the removal of the screws and nuts 16, and the replacement thereof after changing the position of the blocks 15.

The foot rest member cannot become detached or displaced in pushing or pulling the vehicle over an obstruction as in crossing a curb because any upward thrust at the rear end of the said foot rest serves to more firmly engaged the hooks 37 in ring-like member 370, while a similar thrust at the forward end may result in slightly raising that end but will not displace it. While the security of the foot rest mounting is perfect, the intentional removal of the foot rest is accomplished with great facility by first raising the forward hook portions and pushing the foot rest member bodily rearwardly whereupon the rear yoke 36 turns in the hooked channel 32 and permits the hooks 37 on the arms 36 to be readily removed out of the ring-like members. When the foot rest member is detached from the vehicle the yokes may be turned about their hinged mountings and folded over the body of the foot rest, thus facilitating and simplifying storage and packing.

What is claimed is:

1. In a child's vehicle the combination of a bed member, tractional supports for the bed having their edges disposed beyond limits of the body lines of the bed, and a detachable foot rest member carried by the front tractional support and the seat of the vehicle and disposed beneath the bed.

2. In a child's vehicle the combination of a tractionally supported bed member, a back rest secured on the bed member and defining a seat thereon, perforate cleats on the back rest, the bed having perforations therein adjacent the seat and in alignment with the perforations in the cleats, a removable auxiliary back rest mounted on the vehicle and means carried by the removable back rest extending through the perforations in the cleats and in the bed for removably mounting the auxiliary back rest.

3. In a child's vehicle the combination of a tractionally supported bed, a plane foot rest disposed beneath the forward portion of the bed, and means serving to pivotally mount the foot rest member at opposite ends thereof to permit movement of the foot rest member relative to the bed.

4. In a device of the class described the combination of a tractionally mounted bed, a forwardly and outwardly extending bolster supporting the front of said bed, a foot rest member removably supported at its forward end by said bolster and co-operating means carried by the bed and rear end of foot rest member for removably supporting the rear end of the foot rest.

5. In a device of the class described the combination of a bed having a seat adjacent its rear end, a foot rest disposed below and extending forwardly of the seat, means for suspending the rear end of the foot rest from the seat and means for suspending the forward end of the foot rest, said suspending means permitting hinged movement of the foot rest thereon.

6. In a device of the class described the combination of a body member and a foot rest member disposed beneath the body and hingedly supported at its front and rear ends.

7. In a device of the class described the combination of a bed having front and rear bolsters secured thereto, a foot rest member having pairs of arms hingedly mounted at its opposite ends, one of said pairs of arms being adapted to engage the front bolster for supporting the forward end of the foot rest and means on the bed for removably receiving the other of said pair of arms for suspending the rear end of the foot rest and securing it against accidental upward displacement.

8. In a child's vehicle, the combination of a bed having a seat portion and a narrow portion extending forwardly therefrom, front and rear rolling supports for said bed, a foot board substantially the width of the seat portion, and means for suspending said foot board from said bed at least at one end thereof, said means being pivotally connected to said foot board and to the support therefor whereby said foot board may swing relative to said bed.

In testimony whereof, I have hereunto subscribed my name this 14th day of September, 1927.

EMIL M. MAYER.